United States Patent Office 2,708,374
Patented May 17, 1955

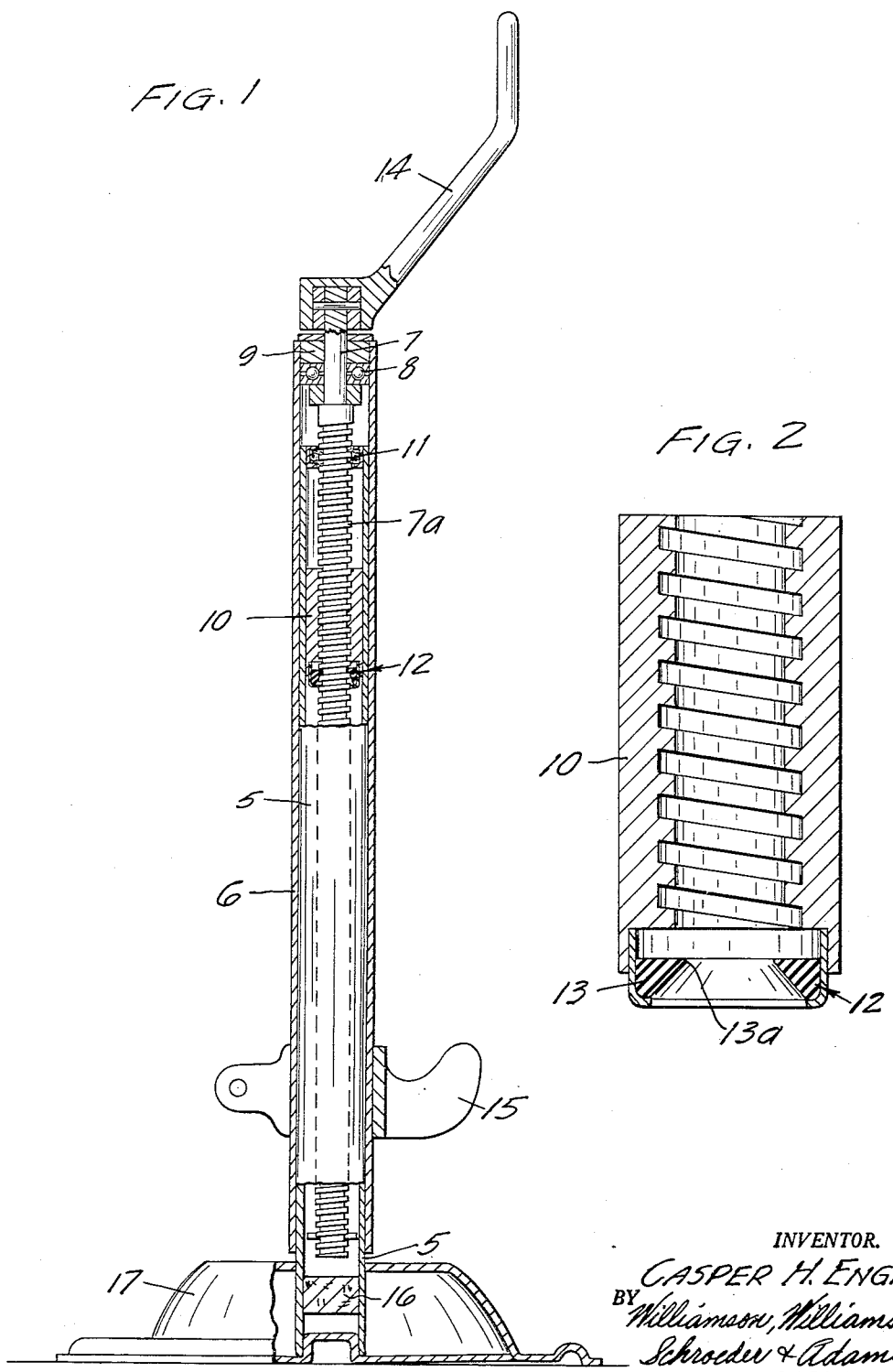

2,708,374

SCREW LIFTING JACK WITH LUBRICATING CHAMBER SEALED AT BOTH ENDS

Casper H. Engh, Fargo, N. Dak.

Application December 29, 1952, Serial No. 328,353

5 Claims. (Cl. 74—424.8)

This invention relates to vehicle lifting jacks and particularly to a lifting jack of the screw type and the means for lubricating the same.

It is an object of my present invention to provide a novel and highly efficient screw-type jack having a lubricating chamber through which the externally threaded screw member passes in its up and down shifting movement to be constantly greased during the operation thereof.

It is another object of my invention to provide a lubricating chamber positively sealed at both ends and surrounding a portion of a projectable screw member and through which the screw member is projected in its up and down shifting movement.

More specifically, it is an object to provide an internally threaded nut mounted in a lubricating chamber with a positive grease seal formed on the top and bottom thereof and therebelow to positively confine the grease within said chamber.

Still more specifically, it is an object to provide an extensible jack having an outer extensible member telescopically adapted to be mounted on a suitable base and having an internally threaded nut member fixed therewithin with a positive grease seal formed therebelow and in spaced relation thereabove to form a sealed grease containing chamber through which a projectable threaded screw passes in its up and down movement, said screw being threadably received within said nut and being journalled at its upper portion in the upper portion of said outer casing member to be confined therewithin, the inner lower casing member being provided with a positive seal thereof to maintain the projection chamber within the inner member entirely clean and free from dirt.

These and other objects and advantages of my invention will more fully appear from the following description made in connection with the accompanying drawings wherein like reference characters refer to the same or similar parts throughout the several views and in which:

Fig. 1 is a central vertical sectional view of my new jack; and

Fig. 2 is an enlarged central vertical sectional view of the internally threaded nut and lubricant seal formed therewithin.

As illustrated in the accompanying drawings, I provide a pair of telescopically interfitted sections, the inner section being designated by the numeral 5 and the outer section being designated by the numeral 6. A longitudinally disposed axial shaft 7 is journalled at its upper end in the outer tubular section 6 and a suitable bearing 8 is provided in the upper portion of said tube 6 and suitable means are provided for preventing longitudinal shifting movement of said shaft 7 relative to said member 6 such as the collar structure 9 tightly pressed therewithin. The shaft 7 has external threads 7a on the major portion thereof disposed below the bearing 8 and an internally threaded nut member 10 is positively fixed within the inner tubular section 5 in slightly spaced relation below the upper end thereof and threadably receives the threaded portion 7a of the shaft 7 therethrough. Suitable packing such as the felt lubricant seal 11 is provided adjacent the top of internal tubular member 5 of the nut 10. The nut 10 has a positive lubricant seal 12 mounted in fixed relation at the lower end thereof and this lubricant seal consists in an annular resilient member 13 having a frusto-conical inside surface with the upper inner periphery 13a being of a diameter to be received in the spiral groove of the threaded portion of the shaft 7 and to tightly embrace said groove portion and remove all of the lubricant therefrom as said shaft passes downwardly through said annular wiper member 13. The frusto-conical or beveled inner periphery permits any grease which may be retained on the shaft to pass freely upwardly with the shaft as the same is projected upwardly through said member 13 and nut 10.

Suitable means for rotating the shaft 7 may be provided such as the crank handle 14 movably mounted on the polygonal top thereof and a lifting element 15 of conventional design may be provided on the outside of outer tubular member 6. The lower end of inner tubular member 5 is positively sealed as by the block member 16 and is adapted to be received in a base member 17. A block 16 prevents dust from entering the auger chamber and maintains the outer surface of the threaded portion 7a of shaft 7 in a clean condition. The chamber formed between the two seals 11 and 12 above nut 10 is initially filled with grease and the two seals positively maintain this lubricant supply within said chamber to provide constant lubrication for the threaded shaft portion. The annular wiper element 13 removes any grease which may pass downwardly through the nut 10 and combines therewith to provide a positive grease seal at the bottom of the lubricating chamber.

It will be seen that I have provided a relatively simple, yet highly efficient permanently lubricated lifting jack mechanism of the screw-threaded type to constantly maintain said jack in easy, efficient operating condition for extremely long periods of time.

It will, of course, be understood that various changes may be made in the form, details, arrangement and proportions of the parts without departing from the scope of my invention which, generally stated, consists of the matter shown and described herein and set forth in the appended claims.

What I claim is:

1. A lifting jack comprising, a pair of vertically telescoping sections, a screw shaft extending axially through said sections and rotatably supported by one of said sections, an internally threaded element fixed in the other of said sections and threadably receiving said worm in close fitting relation therewith, a lubricant seal fixed in the same section as said internally threaded element in longitudinally spaced relation thereto to threadably receive said worm therethrough and form a lubricating chamber sealed at one end, a wiper element mounted on the end of the internally threaded element remote from said lubricant seal to closely surround the spiral groove portion of the externally threaded screw and combined with said internally threaded member to form a positive seal at the other end of the lubricating chamber, said lubricating chamber being adapted to be filled with grease to provide constant lubrication for the externally threaded screw during its up and down projection through the internally threaded element.

2. The structure set forth in claim 1 with a positive plug member mounted in the lower end portion of the inner telescoping section to form a sealed chamber surrounding the entire screw member.

3. A lifting jack comprising a pair of vertically telescoping sections, a screw shaft extending downwardly through said sections and journalled for rotation in the upper portion of the outer section and held against longitudinal shifting movement relative to said outer section, an internally threaded nut member fixed within the inner section in downwardly spaced relation below the top extremity thereof and threadably receiving said form in close fitting relation thereto, a pair of lubricant seals fixed within the inner telescoping section, one being spaced above the internally threaded nut member and the other bing spaced therebelow to form a positively sealed lubricant receiving chamber through which said screw passes during the operation thereof.

4. The structure set forth in claim 3 and the lowermost seal comprising an annular wiper element having a frustoconical inner periphery with the upper diminished peripheral portion thereof of a size to closely embrace a spiral groove portion of the threaded screw shaft.

5. A lifting jack comprising a pair of vertically telescoping sections, a screw shaft extending downwardly through said sections journalled for rotation in the upper portion of the outer section and securely held against longitudinal shifting movement relative to said outer section, an internally threaded nut member fixed within the inner section in downwardly spaced relation below the top extremity thereof and threadably receiving said screw shaft in close fitting relation therewithin, an upper lubricant seal fixed to the inner section in spaced relation above said nut member and a lower lubricant seal mounted in fixed relation to said inner section below said nut member and consisting in a resilient annular wiper element having a straight wiper shoulder surface on the top thereof to positively remove grease from said screw shaft and having an upwardly tapered lower surface to facilitate the passage of said shaft upwardly and to prevent removal of grease from the upper surface of the threads thereon.

References Cited in the file of this patent
UNITED STATES PATENTS

| | | |
|---|---|---|
| 971,286 | Loetzer et al. | Sept. 27, 1910 |
| 2,543,100 | Engh | Feb. 27, 1951 |
| 2,580,170 | Grimmer | Dec. 25, 1951 |